UNITED STATES PATENT OFFICE.

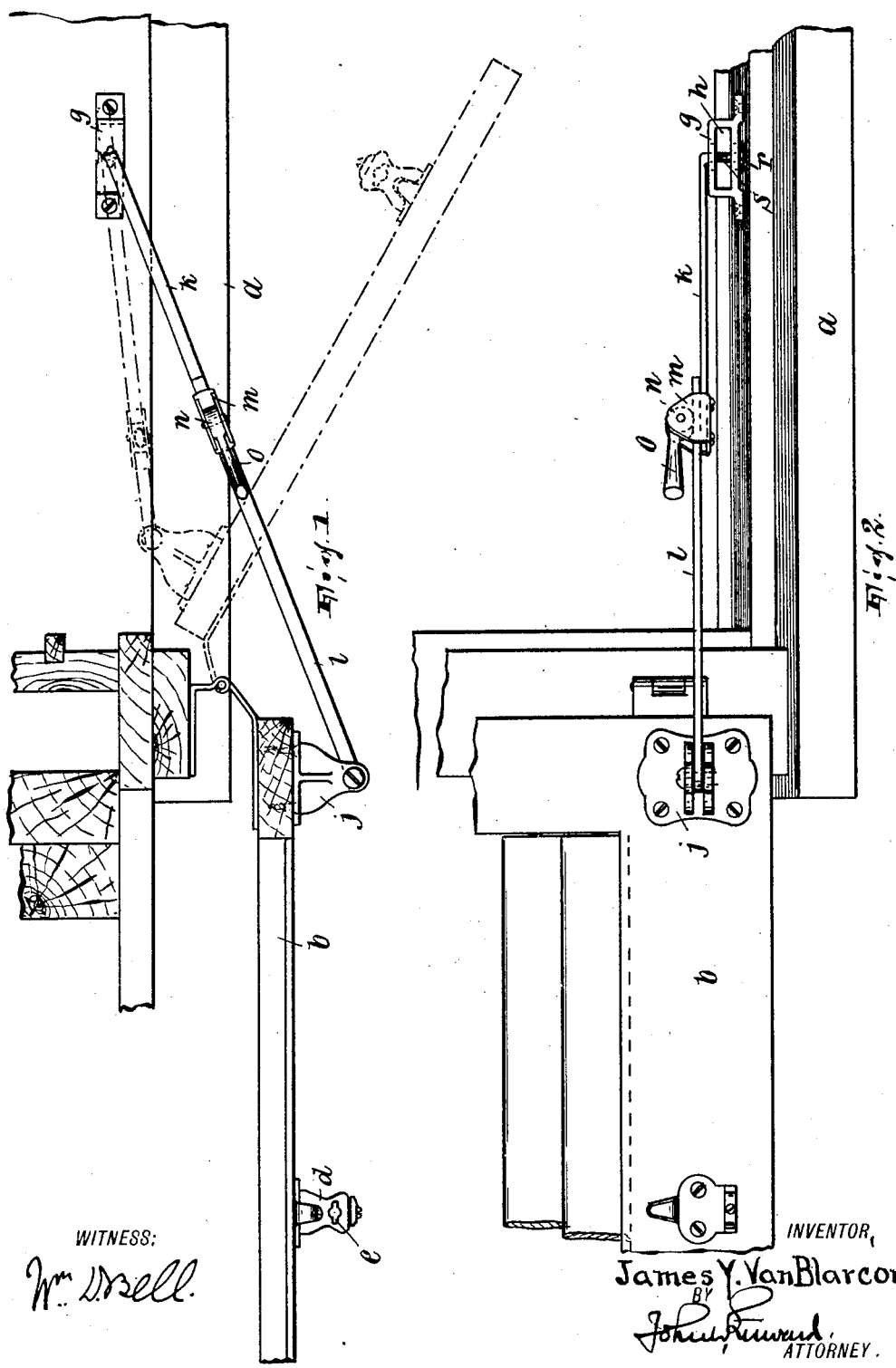

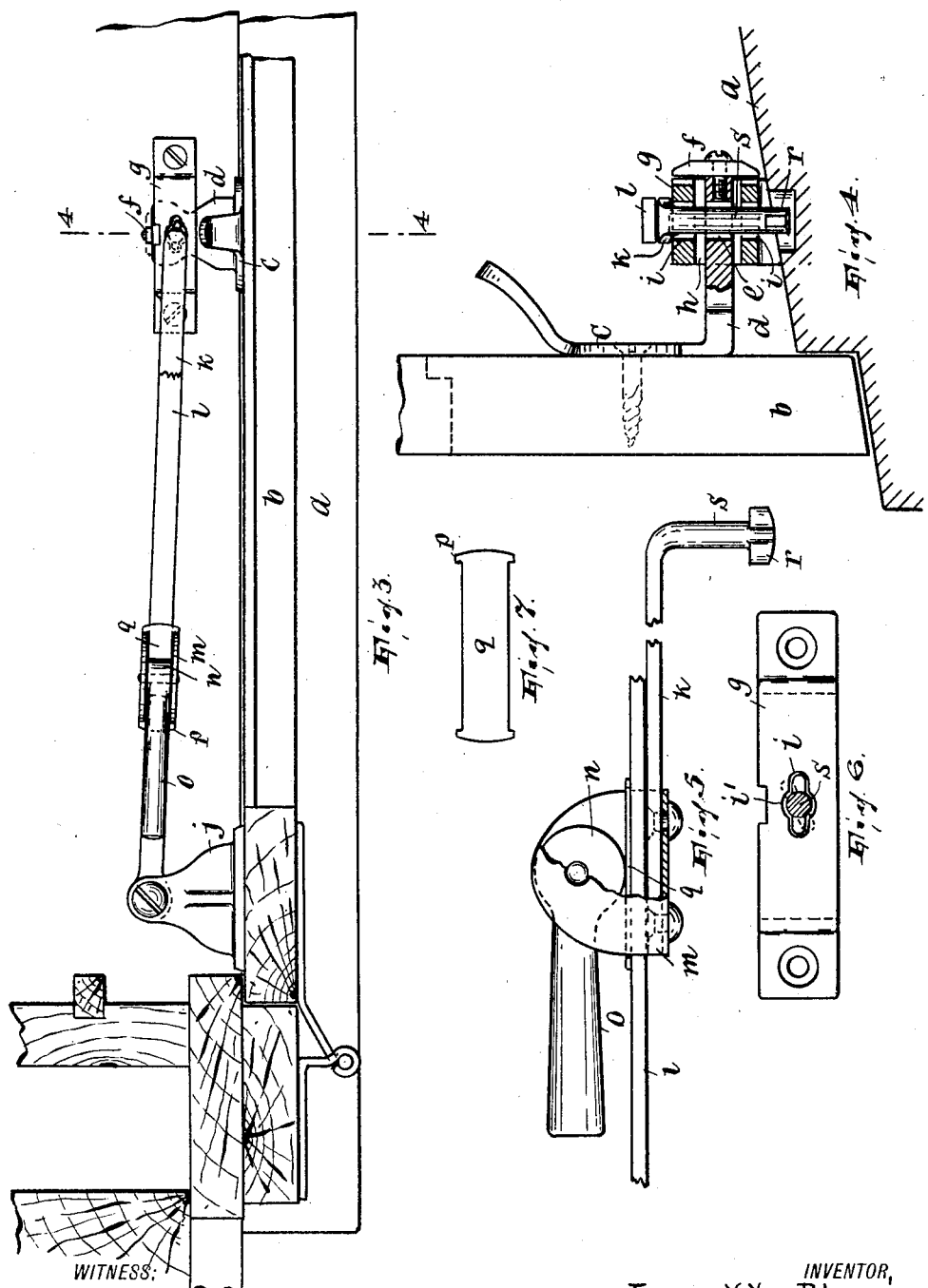

JAMES Y. VAN BLARCOM, OF PATERSON, NEW JERSEY.

SHUTTER-FASTENER.

1,386,291.   Specification of Letters Patent.   Patented Aug. 2, 1921.

Application filed September 10, 1920. Serial No. 409,310.

*To all whom it may concern:*

Be it known that I, JAMES Y. VAN BLARCOM, a citizen of the United States, residing at Paterson, in the county of Passaic and State of New Jersey, have invented certain new and useful Improvements in Shutter-Fasteners, of which the following is a specification.

The object of this invention is to provide a shutter-bower or adjuster, of the class in which a shutter may be bowed to any position or held fully open or closed, whereby the operations incident to its use may be accomplished with facility and also with assurance that the shutter will remain securely held in any position to which it may be adjusted and whereby opening of the shutter from the outside will be prevented in certain positions of the parts, as where the shutter is partially closed as well as where it is fully closed, and which shall be simple in construction, comparatively inexpensive to manufacture and readily attachable as well as adapted to any ordinary window frame and shutter.

One important feature of the invention is an arm pivotally connected at its ends to the frame and shutter and comprising longitudinally slidable sections so as to be extensible, and means to secure said sections to each other in any position to which they may be relatively adjusted. Another important feature consists in providing an arm section, suitably connected to the shutter, with such a pivotal connection with the frame that in one position of the shutter, as the fully closed position, such connection may be readily established or disestablished, but in any other position to which the shutter may be moved while said connection remains established it can not be disestablished, as by wind-movement of the shutter or by manipulation.

In the accompanying drawings,

Figure 1 shows a window frame and shutter in section and my shutter-bower in plan;

Fig. 2 is an outside elevation of the window frame, the shutter and my shutter-bower, the shutter being fully open, as in Fig. 1;

Fig. 3 is a view like Fig. 1, but showing the shutter closed;

Fig. 4 is a section on line 4—4, Fig. 3;

Fig. 5 is a view illustrating in detail the clamping means of the extensible arm;

Fig. 6 is a plan, partly in section, of the aforesaid connection between the arm and window frame; and Fig. 7 is a plan of a certain wear-plate.

In said drawings, $a$ designates the window frame and $b$ a shutter hinged therein in the usual way.

On the shutter is a fitting, substantially L-shaped, its upper or vertical leg $c$ being secured to the shutter by a screw and at the extremity bent away therefrom to form a finger grip, and its horizontal leg $d$ projecting from the shutter and provided with an aperture $e$ (in form preferably like apertures $i$ to be referred to) and having pivoted to its free end an elongated button $f$ which is about as wide as but longer than the leg is thick (see Fig. 2).

On the sill of the frame $a$ is a bracket $g$ which is slotted, as at $h$, so as to receive leg $d$ when the shutter is closed (see Fig. 4) in which position the button $f$ may be turned to block withdrawal of the leg $d$ from the bracket. Button $f$ is an auxiliary means for so blocking withdrawal of said leg, as will appear. Bracket $g$ is provided in its aforesaid slotted portion and in the parts thereof both above and below the slot $h$ with vertically registering apertures $i$, both alike, to wit, elongated, the central portion of each such elongated aperture being enlarged to form a bearing $i'$.

A bracket $j$ is secured in some suitable position to the inside of the shutter.

The brackets $g$ and $j$ are adapted to be connected as follows: $k$ and $l$ designate the flat strip-like sections, overlapping each other, of an extensible arm. One section, $k$, has straddling it and fitted thereto from the under side and suitably secured thereto a U-shaped bearing piece $m$ in which is pivoted a cam $n$ having a handle $o$ for turning it so as in one position to clamp the sections together and in the other to release them. Between the sides or upstanding cheeks of the bearing piece $m$ and between the cam and the section $l$ and having its ends widened, as at $p$, so as to engage said sides or cheeks and thus be held in place, is a wear piece $q$ to assume the wiping action of the cam. It will be obvious that the arm, thus provided with a clamping means, may be altered in effective length upon releasing the cam, and that when it is so altered and the cam made to bind the parts together they will be held securely against further adjustment until the cam is again released. The free end of section $l$ of the arm is suitably pivoted to the bracket $j$. The free end of section $k$ is turned down and provided with a T-head or enlargement $r$, the shank $s$ of the T being preferably rounded. This thus formed down-turned free end of the section $k$ of the arm is adapted to enter the apertures $i$ in a certain position of the arm, as will be explained, and when in that position its shank $s$ has a bearing in the bearings $i$ of said apertures.

Usually, the free or down-turned end of the extensible arm $k$—$l$ will be received in the apertures $i$ of bracket $g$. When it is so received the arm may oscillate in the bracket as the shutter is opened or closed, its parts or sections sliding on each other (the clamp being released) to permit necessary change in the length of the arm. The shutter may be held against movement in any position to which it is swung by clamping the arm sections together by means of cam $o$.

When the down-turned end of arm $k$—$l$ is received in the apertures $i$ of bracket $g$, as explained, it cannot work out of the same by action of the wind or be lifted out except in one position, to wit, when the shutter is fully closed, at which time only, it will be observed, will the T-head $r$ of the arm coincide with apertures $i$: in any other position of the parts said T-head is more or less oblique to the apertures and hence the lateral projections of said T-head coact with the marginal portions of the aperture and form an interlock preventing uplift of the arm and consequent release therefrom of the bracket. The shutter may therefore be partially bowed, and if the arm sections are duly clamped together no movement of the shutter can then be effected from the outside.

When the shutter is fully closed the fitting arm $d$ enters the slot of bracket $g$, and on introducing the down-turned end of the extensible arm into apertures $i$ and through aperture $e$ in arm $d$ said end will act staple-fashion to hold the shutter closed.

Should an outsider succeed in entering a wire to lift and release the arm $k$—$l$ when the shutter is closed and locked, the device $f$ in the position shown in Fig. 4 would still prevent opening of the shutter.

Having thus fully described my invention, what I claim as new and desire to secure by Letters Patent is:—

1. In combination, the frame and a shutter hinged therein, an arm section connected to the shutter, and a fixed device on the frame forming a bearing on which the arm pivotally swings when the shutter is moved on its hinges, the arm being movable longitudinally of the pivot of said bearing to disengage it from said device and said arm and device having portions interlocking to prevent such movement of the arm in certain positions to which it swings on said pivot but clearing each other to permit said movement in another position to which the arm swings on said pivot.

2. In combination, the frame and a shutter hinged therein, an extensible arm pivotally connected to the shutter, and a fixed device on the frame forming a bearing on which the arm pivotally swings when the shutter is moved on its hinges, the arm being movable longitudinally of the pivot of said bearing to disengage it from said device and said arm and device having portions interlocking to prevent such movement of the arm in certain positions to which it swings on said pivot but clearing each other to permit said movement in another position to which the arm swings on said pivot.

3. In combination, the frame and a shutter hinged therein, an extensible sectional arm connected to the shutter, a fixed device on the frame forming a bearing on which the arm pivotally swings when the shutter is moved on its hinges, the arm being movable longitudinally of the pivot of said bearing to disengage it from said device and said arm and device having portions interlocking to prevent such movement of the arm in certain positions to which it swings on said pivot but clearing each other to permit said movement in another position to which the arm swings on said hook, and means to secure the sections of the arm together.

In testimony whereof I affix my signature.

JAMES Y. VAN BLARCOM.